United States Patent [19]

Troung et al.

[11] Patent Number: 5,309,515
[45] Date of Patent: May 3, 1994

[54] CURRENCY NOTE WIDTH DETECTOR

[75] Inventors: Peter Troung, Browns Mills; Michael L. DeFeo, Runnemede, both of N.J.; Paul Hessler, Oreland, Pa.; Kenneth W. Maier, Levittown, Pa.; Martin J. Poloncarz, Oreland, Pa.; William Sherman, III, Medford, N.J.

[73] Assignee: Brandt, Inc., Bensalem, Pa.

[21] Appl. No.: 64,335

[22] Filed: May 20, 1993

Related U.S. Application Data

[63] Continuation of Ser. No. 676,188, Mar. 27, 1991, abandoned.

[51] Int. Cl.⁵ .............................................. G06K 9/00
[52] U.S. Cl. .......................................... 382/7; 382/54; 382/58; 250/560
[58] Field of Search ............... 382/7, 54, 58; 250/556, 250/262, 560; G06K 9/00, 9/40, 9/20, 7/10, 5/00, 11/00; G01V 5/00, 9/04; G01N 21/86

[56] References Cited

U.S. PATENT DOCUMENTS

| 3,731,799 | 5/1973 | Meloni et al. | 209/111.7 |
|---|---|---|---|
| 4,298,807 | 11/1981 | Favre | 250/262 |
| 4,348,656 | 9/1982 | Gorgone et al. | 340/146.3 |
| 4,435,834 | 3/1984 | Pauli et al. | 382/7 |
| 4,473,157 | 1/1984 | Hirose et al. | 209/534 |
| 4,479,049 | 10/1984 | Hirose | 235/379 |
| 4,554,444 | 11/1985 | Hirose | 235/379 |
| 4,559,451 | 12/1985 | Curl | 250/560 |
| 4,559,452 | 12/1985 | Igaki et al. | 250/560 |
| 4,590,606 | 5/1986 | Rohrer | 382/54 |
| 4,710,963 | 12/1987 | Chapman et al. | 250/556 |
| 4,817,804 | 4/1989 | Kawano et al. | 209/534 |
| 4,823,393 | 4/1989 | Kawakami | 382/7 |
| 4,944,505 | 7/1990 | Sherman, III | 250/560 |
| 5,006,719 | 4/1991 | Blaser | 250/560 |

Primary Examiner—Yon J. Couso
Attorney, Agent, or Firm—Shenier & O'Connor

[57] ABSTRACT

Apparatus for accurately determining the width of a traveling document in which respective groups of LEDs are disposed along a line extending transversely of the path of document travel inwardly from points spaced by a distance greater than the maximum document width. The groups of LEDs and respective strip photodiodes associated therewith are disposed on opposite sides of the path so that a document travelling along the path partially blocks respective LEDs of said groups. The LEDs are sequentially energized one by one from one end of the group to the other. The completely unblocked energized LEDs are counted and the percent blocked of the partially blocked LED is determined to permit an accurate width measurement to be calculated.

20 Claims, 9 Drawing Sheets

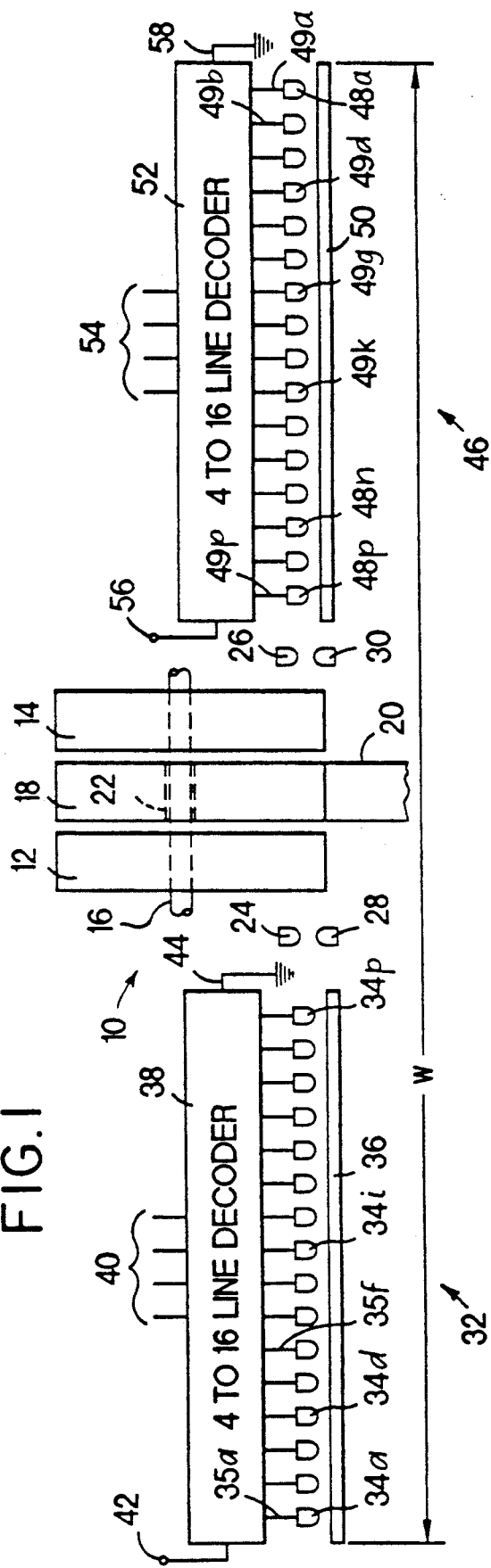
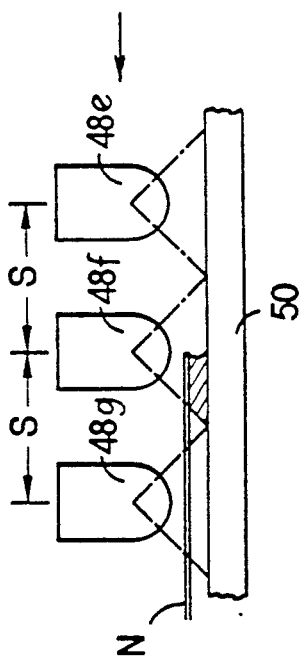
FIG. 1
FIG. 2

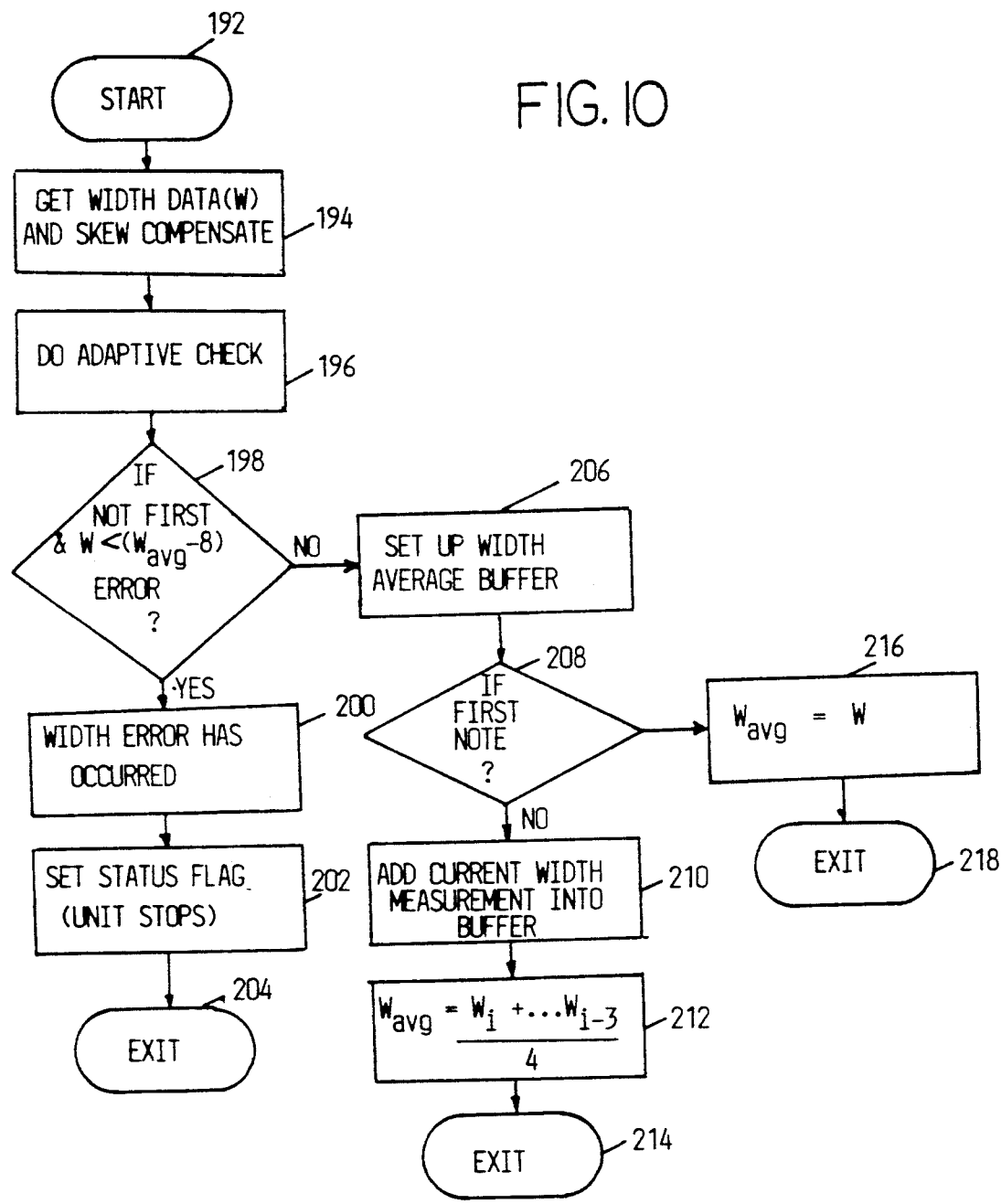

5,309,515

CURRENCY NOTE WIDTH DETECTOR

This is a continuation of copending application Ser. No. 07/676,188, filed on Mar. 27, 1991, now abandoned.

FIELD OF THE INVENTION

The invention is in the field of width detector more particularly, it relates to a currency note width detector for measuring the dimension of a currency note in a direction transverse to the direction of travel thereof.

BACKGROUND OF THE INVENTION

Many systems are known in the prior art for testing currency notes to determine the genuineness thereof and to discriminate between notes of different denominations. Most of these devices involve reading indicia printed on a face of the note and comparing it with stored data. Some of the devices involve a rough measurement of a dimension of the note in the direction of travel thereof through the device.

A few devices of the prior art make a determination of the dimension of a note in a direction transverse to the direction of travel thereof. For example, Pauli et al U.S. Pat. No. 4,435,834 discloses an arrangement in which the note passes through the space between an illuminating means and a row of photodiodes. The number of darkened photodiodes is counted and divided by the number of diodes per unit width to obtain a measure of width which is compared with maximum and minimum values.

Favre U.S. Pat. No. 4,298,807 discloses an arrangement in which the document passes by an array of sixty photodiodes corresponding to the maximum width of the document to be inspected. These photodiodes are arranged in groups of four for analog multiplexing. The outputs of the multiplexing circuit are applied to analog to digital converters and averaging circuits and to a common comparator circuit to give information as to the dimension of a note.

While the systems just described afford a rough indication of the width of a document being inspected, the measurement afforded thereby is not as accurate as is desirable in many instances. For example, in certain countries respective denominations of currency are differentiated by width. Known systems do not afford as accurate a width measurement as is necessary effectively to discriminate between notes of different denominations.

SUMMARY OF THE INVENTION

One object of our invention is to provide a device for measuring the width of a document such as a currency note.

Another object of our invention is to provide a currency note width measuring device which is more accurate than are similar devices of the prior art.

Still another object of our invention is to provide a currency note width detecting device which is certain in operation.

A further object of our invention is to provide a currency note width measuring device which is simple in construction and operation for the results achieved thereby.

Other and further objects of our invention will appear from the following description.

BRIEF DESCRIPTION OF THE DRAWINGS

In the accompanying drawings to which reference is made in the instant specification and which are to be read in conjunction therewith and in which like reference characters are used to indicate like parts in the various views:

FIG. 1 is a schematic view of our currency note detecting device illustrating the geometry thereof.

FIG. 2 is a fragmentary view of the device illustrated in FIG. 1 drawn on an enlarged scale.

FIG. 10 is a flowchart illustrating the overall operation of our currency note width detector.

DESCRIPTION OF THE PREFERRED EMBODIMENT

Figure 3:
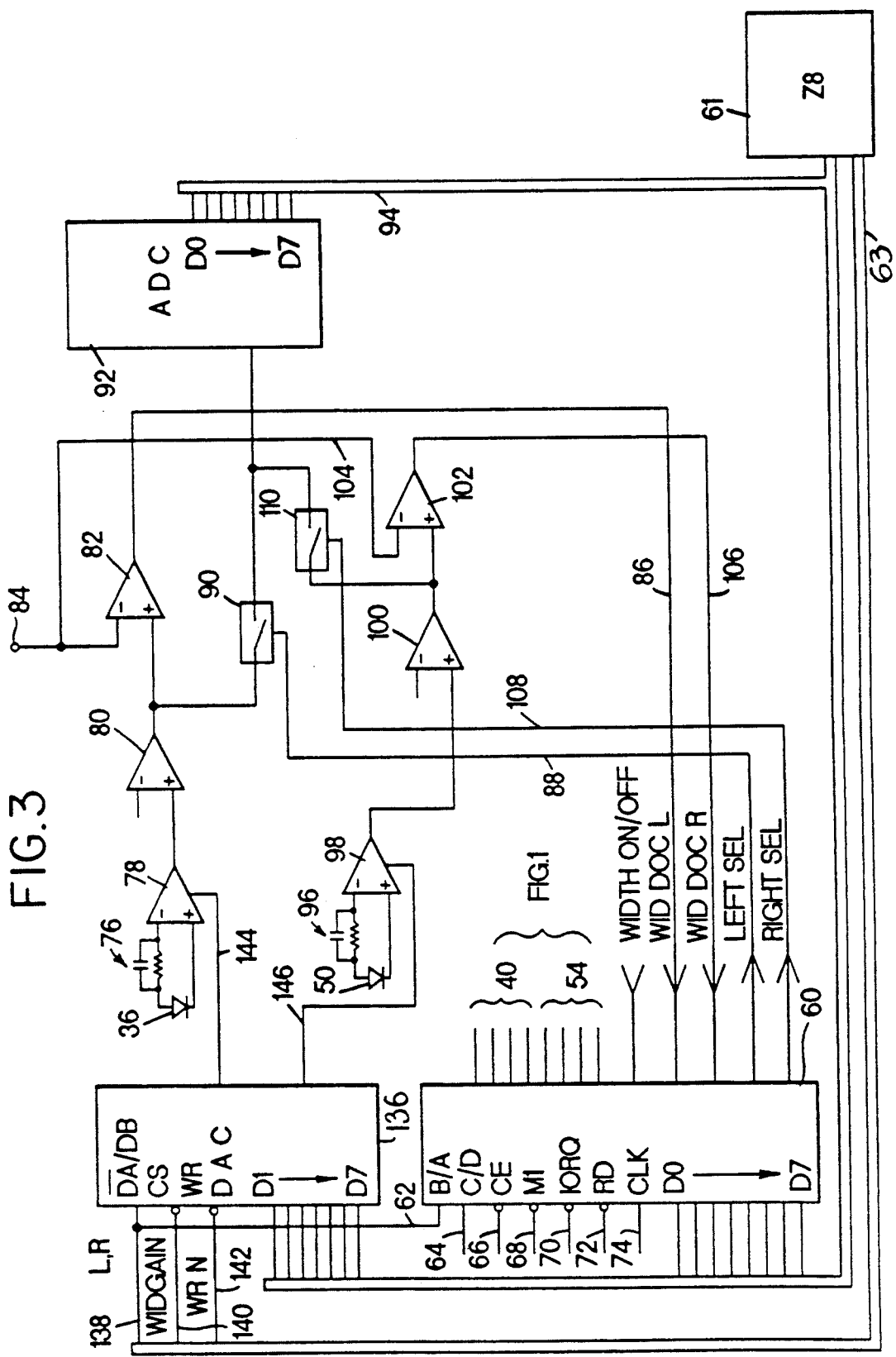
FIG. 3 is a schematic view of the circuitry of our currency note width measuring device.

Referring now to FIG. 1, our improved currency note width measuring device may be used with any type of sheet handling device known to the prior art. For example, Pat. No. 4,474,365 shows such an apparatus which includes a pair of feed rolls 12 and 14 mounted in spaced relationship on a shaft 16. As is known in the art, feed rolls 12 and 14 and associated strippers (not shown) are adapted to remove currency notes one by one from the bottom of a supply of notes. Notes removed from the supply by the feed rolls 12 and 14 are advanced toward the nip between a pair of accelerating rolls 18 and 20, one of which is rotatably supported on the shaft 16 by means of a bearing 22. Further as is known in the prior art, notes picked out of the supply by the feed rolls 12 and 14 and advanced by the accelerating rolls 18 and 20 are moved to a delivery location. In the course of this movement a pair of LEDs 24 and 26 and associated photodiodes 28 and 30 detect the presence of a note in the feed path.

Our width measuring system includes a first or left-hand array indicated generally by the reference character 32 of sixteen LEDs 34a to 34p. A strip photodiode 36 of a type known in the art spans the left-hand array 32 of LEDs. As will be explained more fully hereinbelow, a left-hand four-to-sixteen line decoder 38 of a type known in the art responds to a binary coded input 40 sequentially to connect the LEDs 34a to 34p between a source 42 of potential and ground 44 through conductors 35a to 35p to illuminate the same.

We provide our system with a right-hand array indicated generally by the reference character 46 of LEDs 48a to 48p associated with a strip photodiode 50 which spans the array 46. A right-hand four-to-sixteen line decoder 52 responds to binary coded input 54 to connect the LEDs 48a through 48p sequentially from outermost to innermost between a source 56 and ground 58 through conductors 49a to 49p.

Referring now to FIG. 2, we have shown an idealized form of our device in which adjacent LEDs such as 48e, 48f and 48g illuminate contiguous areas of the associated photodiode 50. It will readily be appreciated that in practice some overlapping of the adjacent illuminated areas takes place which must be compensated for in the course of the calculations described hereinbelow.

Referring now to FIG. 3, our width measuring system includes an interface 60 which may, for example, be a Z84C2 having control input terminals B/A, C/D, CE, M1, IORQ, and RD, which receive control input signals from a CPU 61 which may be a Z80 to respective lines 62, 64, 66, 68, 70 and 72 and a CLK input on line 74 by means of a control bus 63. In operation of the system component 60 puts out the line decoder input signals 40 and 54.

We connect the photodiode 36 across the input terminals of an operational amplifier 78. In so doing we connect a parallel RC circuit 76 between one terminal of the diode and the associated terminal of the operational amplifier 78 to compensate for the phase lag introduced by the capacitance of the strip photodiode 36. We apply the output of operational amplifier 78 to a buffer amplifier 80, the output of which is applied to one terminal of a comparator 82. A reference voltage at terminal 84 is connected to the other terminal of the comparator 82.

Our system first produces left and right digital signals indicating respectively the number of energized completely unblocked LEDs 34 and the number of energized completely unblocked LEDs 48. When that has been done, left and right analog signals are produced indicating respectively the percentage unblocked of the partially blocked LED34 and the percentage unblocked of the partially blocked LED48.

As will be apparent from the description hereinbelow, we set the gain of the operational amplifier 78 to provide a predetermined voltage of, for example, five volts when any energized LED is completely uncovered. We further so select the reference voltage at 84 that the comparator 82 produces an output signal when the voltage of amplifier 78 drops below, for example, 4.5 volts indicating that the LED which has been energized is partially blocked. When this occurs, comparator 82 puts out a signal WID DOC L on line 86. In response to this signal, component 60 stops and holds the input to decoder 38 so that the next inboard LED34 of array 32 is not illuminated.

We connect the strip photodiode 50 across the terminals of an operational amplifier 98. A phase compensating network 96 accounts for the phase lag introduced by the strip photodiode. A buffer amplifier 100 applies the output of amplifier 98 to one terminal of a comparator 102, the other terminal of which is connected to the source 84 of reference potential by a conductor 104. As was the case with the left LED, when the energized right LED 48 is not completely blocked, the output of amplifier 98 drops below a predetermined value to cause comparator 102 to put out a WID DOC R signal on line 106. In response thereto, the component 60 inhibits further energization of LEDs in the right-hand array and holds the current address on output 54.

As known in the art, the strip photodiodes 36 and 50 are linear devices. Consequently, the output of the converter 92 represents the percentage of the area illuminated by that energized light emitting diode which is partially blocked by the edge of the note. This will readily be appreciated from the showing of FIG. 2 in which the areas of the strip photodiode 50 which are illuminated by the respective LEDs 48 are bounded by the dot-dash lines. As is shown therein, a note partially blocks the LED 48f. If this is the energized LED the corresponding output of ADC 92 will indicate the percentage of the area which is not blocked by the edge of the note N. In FIG. 2 the blocked area is indicated by the shading below the note.

After the left and right digital signals have been produced, component 60 provides a LEFT SEL signal on line 88. This signal closes a switch 90 to couple the output of the buffer 80 to the input of an analog to digital converter 92 which may be an ADC0804. In response thereto, the converter 92 provides a digital output signal on a data bus 94 connected to the CPU 61.

Next, component 60 puts out a RIGHT SEL signal on conductor 108 to close switch 110 to apply the output of buffer 100 to the ADC 92.

As has been explained hereinabove, the LEDs 34 and 48 of each of the arrays 32 and 46 are sequentially energized from the outermost to the innermost until a partially blocked LED is encountered, at which time no further LEDs are energized. In arriving at our width measurement, we count the number of energized, completely unblocked LEDs.

The system is provided with means for controlling the gain of the amplifiers 78 and 98 in such a way as to compensate for any differences in illumination intensity provided by the LEDs 34 and 48 of the two groups, 32 and 46. A digital to analog converter 136 receives its control inputs from the CPU control bus 63 on lines 138, 140 and 142. Bus 94 provides the data inputs to component 136. When one of the LEDs 34 is energized, DAC 136 provides a signal on line 144 to regulate the gain of amplifier 78.

More specifically, in our arrangement for compensating for any differences in illumination intensity provided by the LEDs 34 and 48 of the two groups 32 and 46, the current through each LED and the light emitted by each LED stays the same. However, the gain of the associated amplifier is so controlled that no matter which LED is energized, the particular strip photodiode amplifier 78 or 98 puts out 5 volts with no document present. The gains required to produce this result are stored in tables in the microprocessor 61. Then, when a particular LED is turned on, the microprocessor causes the gain of the associated photodiode amplifier to be such as will produce the desired 5 volt output in the absence of a document.

Figure 4:
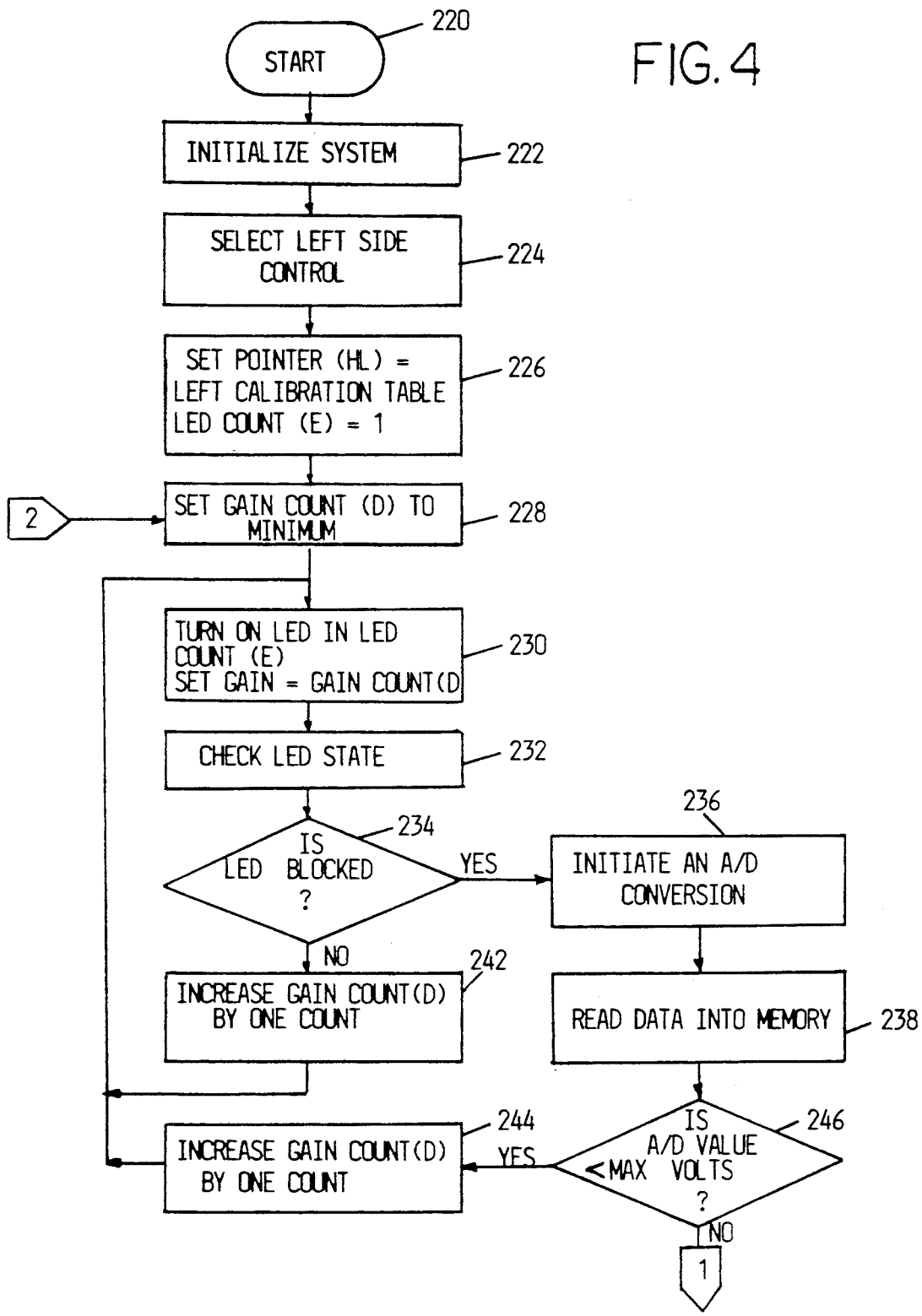
FIG. 4 is a flowchart illustrating the initial portion of the operation of the calibration system of our currency note width detector.
Figure 5:
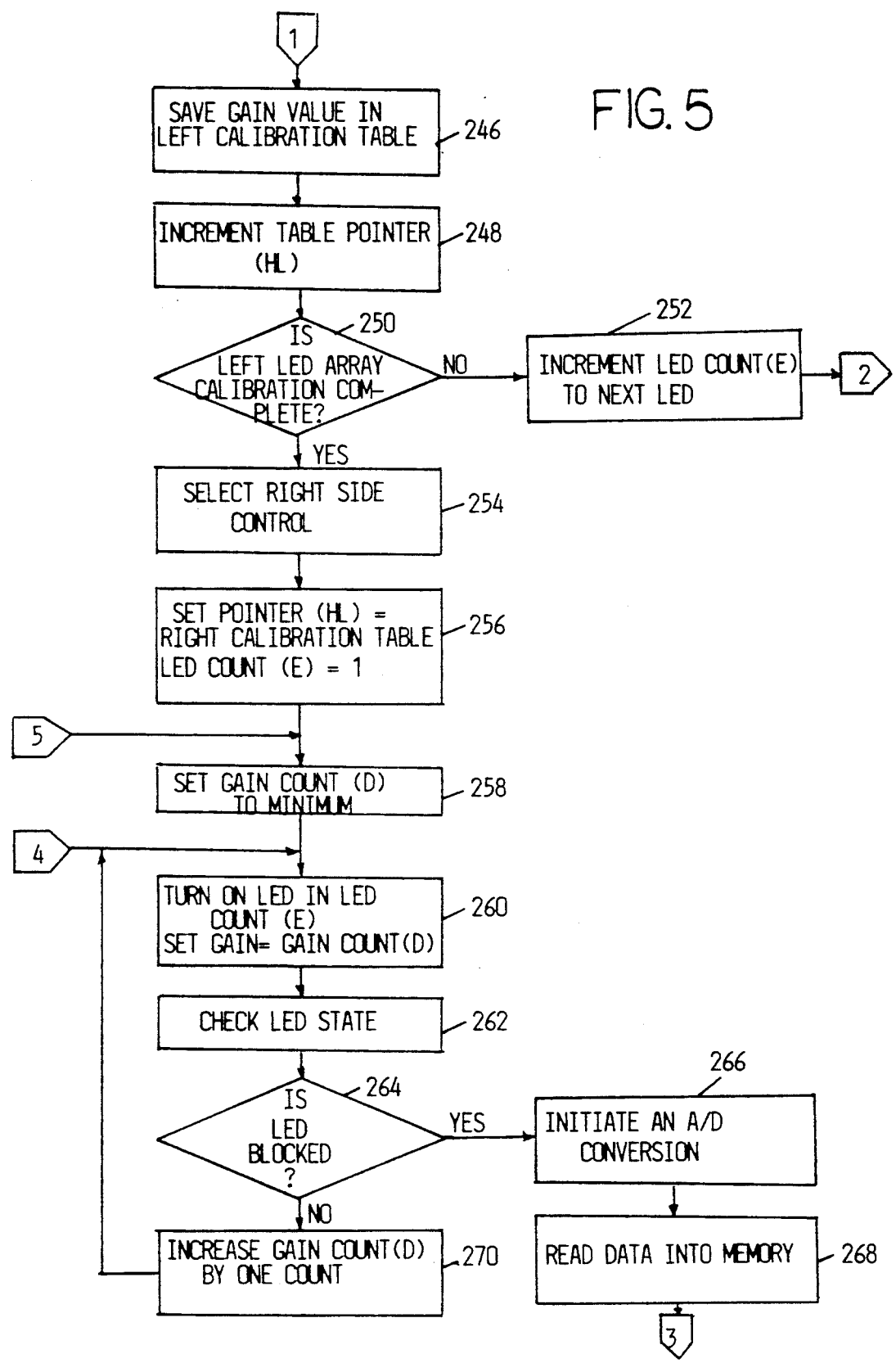
FIG. 5 is a flowchart illustrating a further portion of the operation of the calibration system of our currency note width detector.
Figure 6:
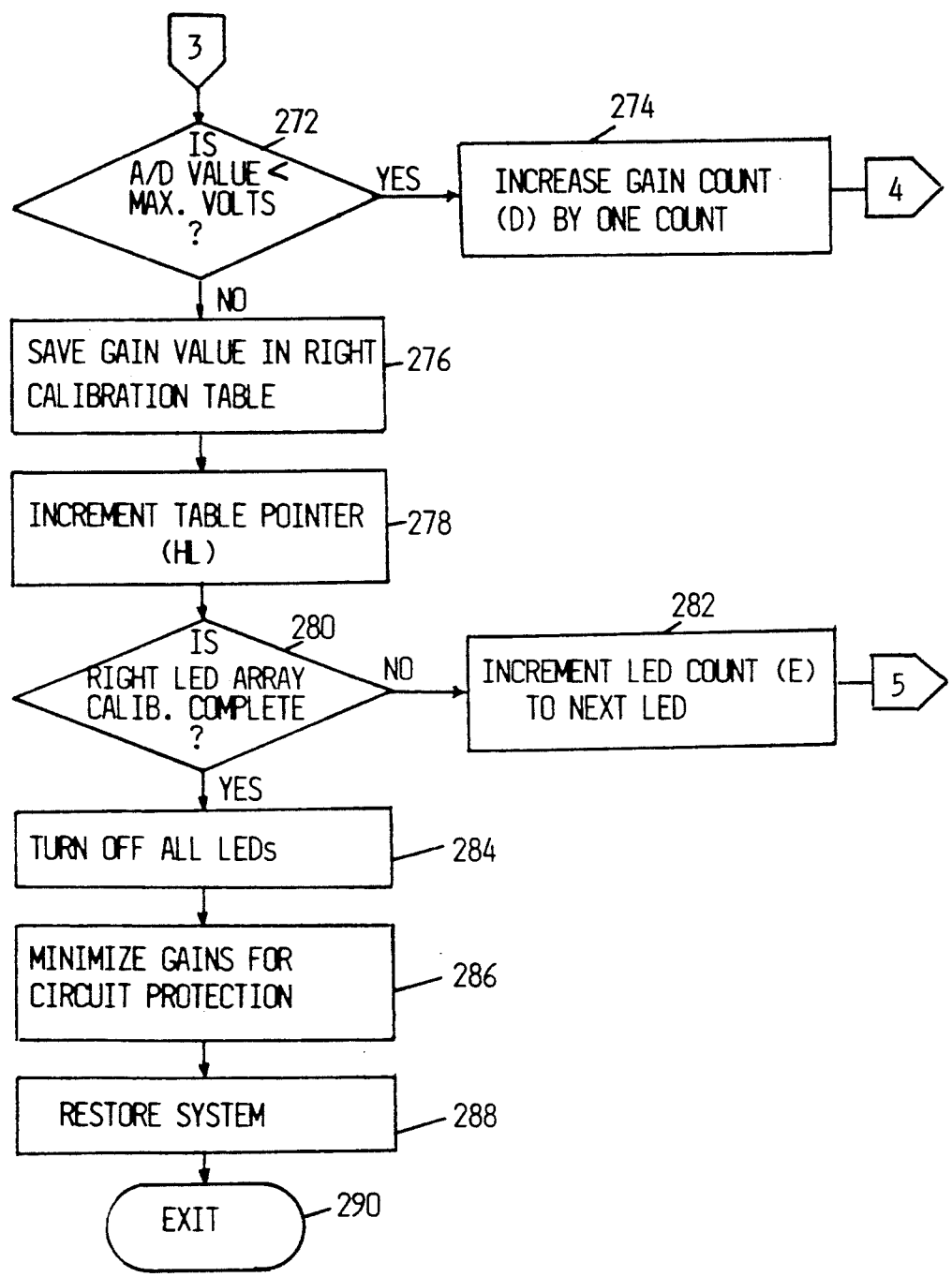
FIG. 6 is a flowchart illustrating the final portion of the operation of the calibration system of our currency note width detector.

Referring now to FIGS. 4 to 6, the flowcharts shown therein illustrate our system for calibrating the width detector so that no matter which LED is energized, the amplifier associated with the corresponding linear photodiode will, in the absence of a document, always produce the same output voltage. Starting at 220, the system is initialized at 222 and the left side control is selected at 224. At this point a register of the Z80 microprocessor 61 is set as the left calibration table. The D register carries the gain count and the E register carries the LED count which, at this point, is equal to 1. The D register is set at the minimum gain at 228, the current LED in E is turned on and the gain is set to D at 230. The LED state is checked at 232 and a determination is made at 234 of whether or not the LED is blocked. If so, an analog to digital conversion is initiated at 236 and the data is read into memory at 238. A check is made at 240 to determine whether or not the analog to digital value is less than the maximum allowable voltage. If not, the system proceeds to "1" in FIG. 5.

If it is determined at 234 that the LED is not blocked, the gain representation in register D is increased by one count at 242 and the system returns to block 230. By the same token, if the analog to digital value is determined to be less than the maximum voltage at 240, the gain count in register D is increased by 1, as indicated by block 244 and the system returns to 230.

If it had been determined at 240 that the analog to digital value was not less than the maximum voltage so that the system proceeded to "1" in FIG. 5, the gain value is saved in the left calibration table as indicated by 246 and the table pointer (HL) is incremented at 248. Next a determination is made at 250 of whether or not the left LED array calibration is complete. If not, register E is incremented to the next LED at 252 and the system returns to "2" of FIG. 4.

If a determination has been made at 250 that the left LED calibration is complete, the right side control is selected at 254. Register HL is set to the right calibration table and register E to the LED count which, at this point, is equal to 1, all as indicated at 256. Next, register D, the gain count, is set to the minimum gain as indicated at 258 and LED in register E is turned on and the gain is set to D, as indicated at 260. Next, the LED state is checked at 262 and a determination is made at 264 of whether or not the LED is blocked. If it is, an analog to digital conversion is initiated at 266, the data is read into memory at 268 and the system proceeds to "3" of FIG. 6.

If the check at 264 indicates that the LED is not blocked, the gain is increased by one count at 270 and the system returns to block 260.

Following a reading of the data into memory at 268 so that the system proceeds to "3" of FIG. 6, a determination is then made at 272 of whether or not the analog to digital value is less than the maximum allowable voltage. If so, the gain count in register D is increased by 1 and the system returns to "4" of FIG. 5.

If, at 272, a determination is made that the analog to digital value is not less than the maximum volts, the gain value is saved in the right calibration table at 276. The table pointer (HL) is incremented at 278. Next, a determination is made at 280 of whether or not the right LED array calibration is complete. If not, register E is incremented to the next LED at 282 and the system returns to "5" of FIG. 5.

If, at 280, a determination is made that the right LED calibration is complete, all LEDs are turned off at 284, gains are minimized for circuit protection at 286, and the system is restored at 288 to EXIT at 290.

Figure 7:
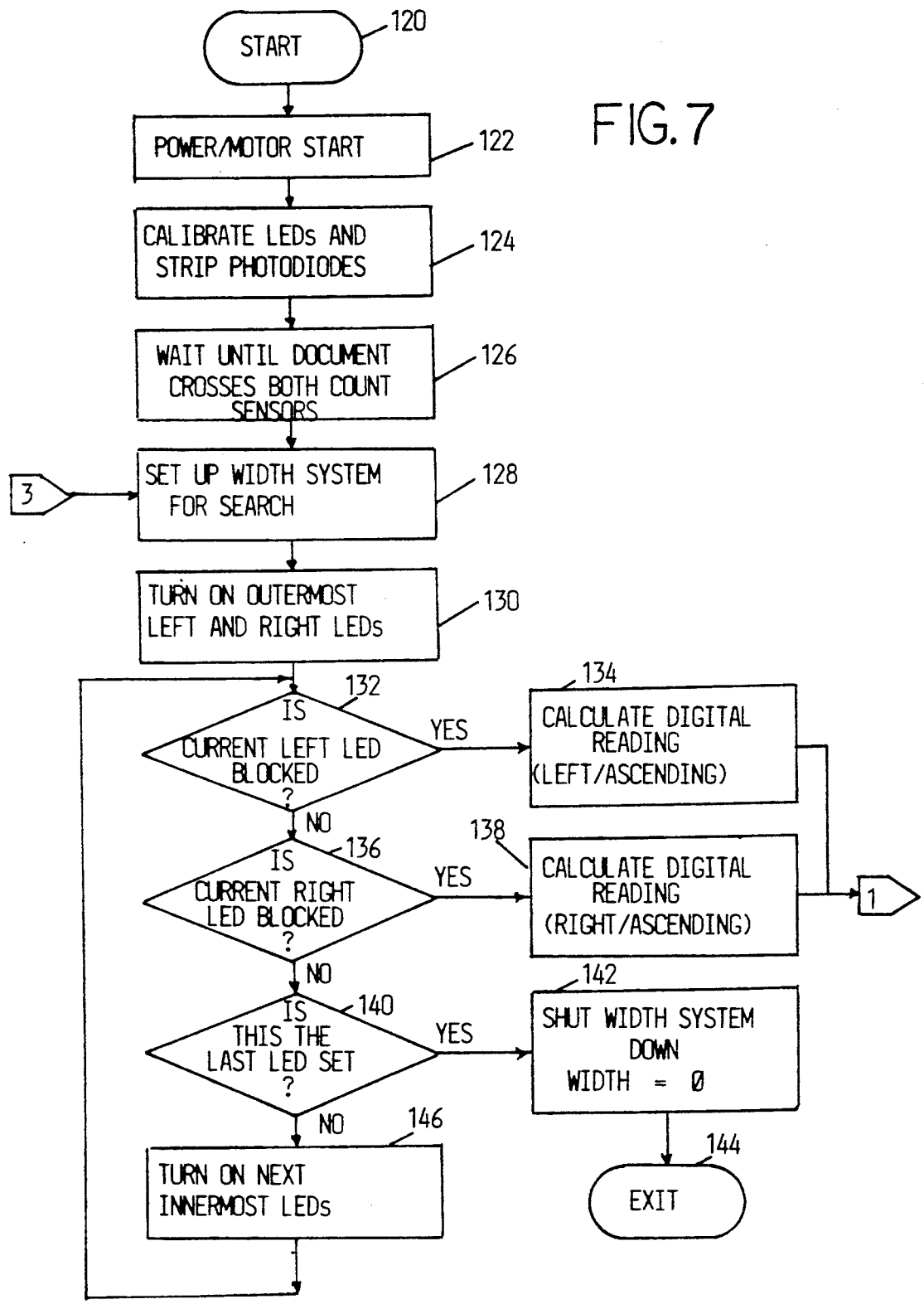
FIG. 7 is a flowchart illustrating a first stage in the operation of our currency note width detector.
Figure 8:
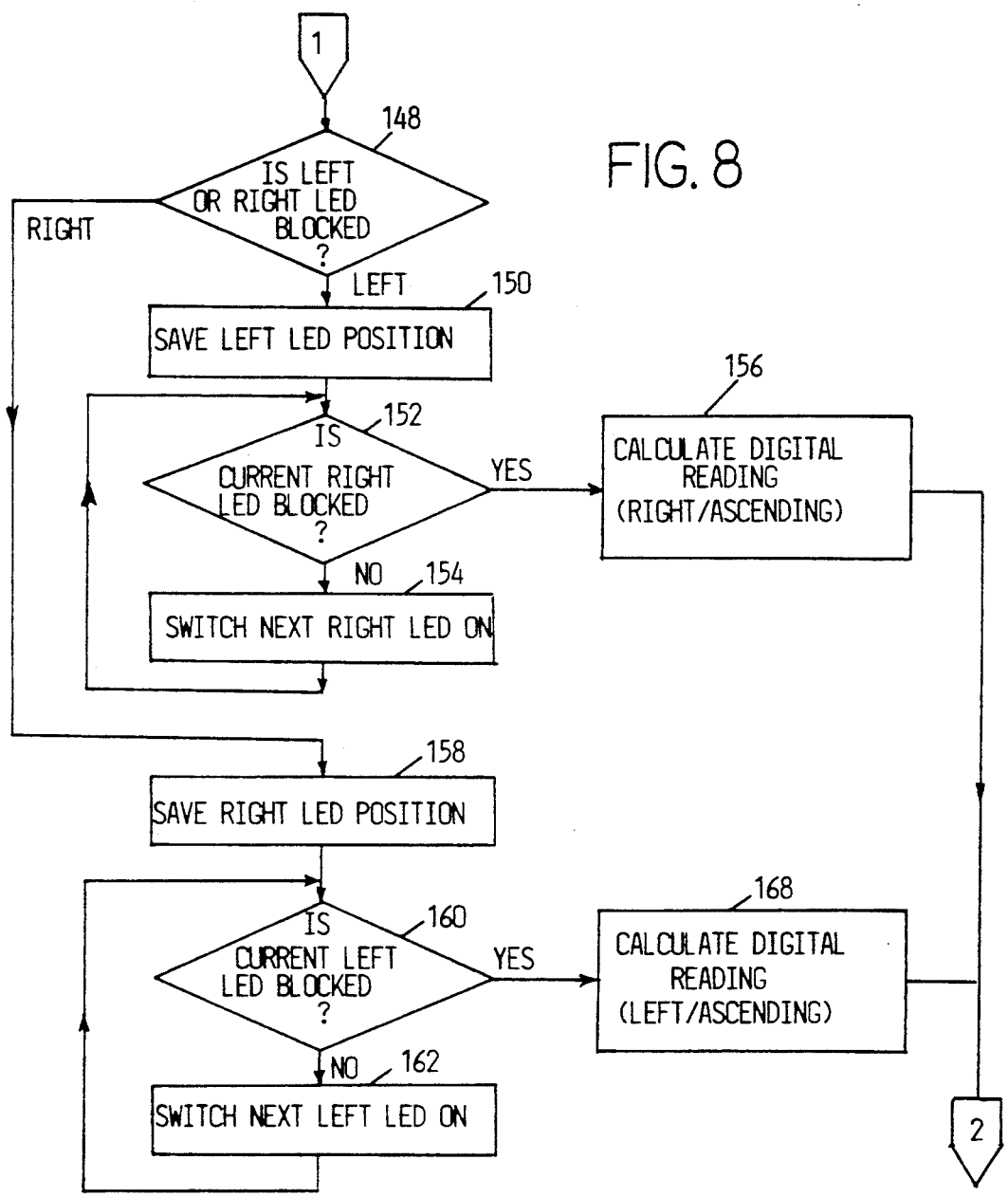
FIG. 8 is a flowchart illustrating a second stage in the operation of our currency note width detector.
Figure 9:
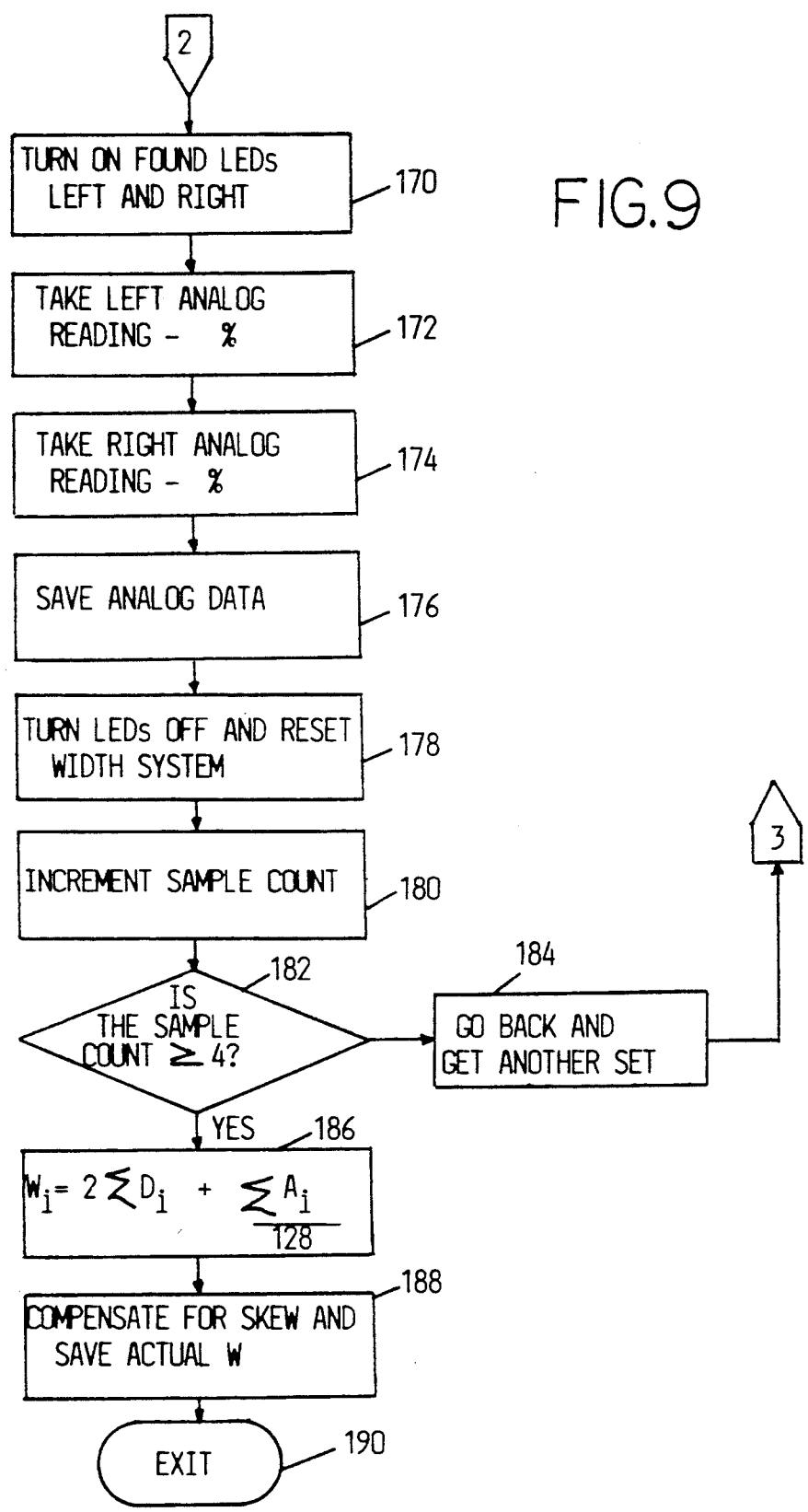
FIG. 9 is a flowchart illustrating a third stage in the operation of our currency note width detector.

The operation of our currency note width detector can best be understood by reference to the flow charts of FIGS. 7 to 9. First, the system START is indicated at 120, power is up and the motor (not shown) starts as indicated by block 122. Next, at 124 the LED and strip photodiodes are calibrated as shown in FIGS. 4 to 6. Once a document starts flowing through the system, as indicated at block 126, as soon as it crosses both count sensors made up of LEDs 24 and 26 and photodiodes 28 and 30, the width system is set up for search a indicated at 128. This entails loading the LED gain calibration tables and turning on the outermost left and right LEDs 34a and 48a, as indicated at block 130.

When the system has been set up in the manner described, a check is made at 132 to see if the current left LED is blocked. If so, a left digital reading is calculated at 134 and the system proceeds to "1" at FIG. 8. If the current left LED is not blocked, a check is made at 136 to see if the current right LED is blocked. If so, the right digital reading is calculated at 138 and the system again proceeds to "1" at FIG. 8.

If the current right LED is not blocked, a check is made at 140 to see if this is the last LED set. If so, at 142 the system shuts down indicating that the width is zero and proceeds to EXIT at 144. If it is not the last LED set, the next innermost LEDS are turned on at 146 and the system returns to the input of 132.

The process of FIG. 7 is repeated until, for instance, a left side LED is the first to be blocked. The digital value is calculated at 134 and saved. The process of FIG. 7 is repeated until one side, left or right, is found to be blocked. The digital value is then calculated and saved at 134 for a blocked left LED or at 138 for a blocked right LED.

Regardless of which side is found to be blocked first, processing continues from either 134 or 138 in the manner outlined in FIG. 8.

The calculations represented by blocks 134 and 138 are performed in the manner outlined in FIG. 8. A determination is made at 148 of whether it is the left or the right side LED which is blocked. If it is a left side LED, the left side position is saved at 150. A check is then made at 152 to determine whether or not the current right LED is blocked. If so, a right digital reading is calculated at 156 and saved.

If the current right LED is not blocked, the next right LED is switched on at 154 and the system returns to the input of 152.

If, at 148 it has been determined that the right side LED is blocked, this position is saved at 158 and a determination is made at 160 of whether or not the current left LED is blocked. If so, the left digital reading is calculated at 168 and saved. If the current left LED is not blocked, the next left LED is switched on at 162 and the system returns to the input of 160.

Referring now to FIG. 9, after the right and left digital readings have been calculated the found left and right LEDs are turned on at 170. A left percent analog reading is taken at 172 and a right analog percent reading is taken at 174. This analog data is saved at 176 and the LEDs are turned off and the width system reset at 178. At this point the sample count is incremented at 180. Next, a determination is made at 182 of whether or not the sample count is equal to or greater than 4. If not, as indicated by block 184, the system returns to get another set of values beginning at block 128.

If the sample count is equal to or greater than 4, a width value is calculated at 186 in accordance with the algorithm $W_i = 2\Sigma D_i + \Sigma A_i/128$. Where $\Sigma D_1$ is the sum of the left and right digital values and dividing $\Sigma A_1$ (the sum of left and right analog values) by 128 provides a decimal value which can be added to $\Sigma D_i$ to give the width value $W_i$. The resultant value is compensated for skew at 188, the actual width W is saved, and the system proceeds to EXIT at 190.

In the foregoing description, the readings indicated in blocks 172 and 174 are inverted so that a lighter document has a smaller reading.

The algorithm of block 186 fits the width data in order to provide the best approximation to the true document width.

Skew compensation in block 188 may be accomplished in any suitable manner known to the art, such for example as that shown and described in Pat. No.

4,944,505 issued Jul. 31, 1990 to William Sherman III, the disclosure of which is incorporated herein by reference. Skew compensation subtracts an offset based on the skew angle $\phi$ such that $W=W_1 \cos$ of $\phi$.

Referring now to FIG. 10, in the overall operation of the system starting at 192, four samples of width data are fit and compensated for skew, resulting in W, as indicated at 194. Next, an adaptive check is performed at 196 to compare the measurement of the bill which has just undergone scrutiny with a number of stored values. Following that check, a determination is made at 198 of whether or not W is less than ($W_{avg}-8$). The tolerance value of 8 is a variable which can be adjusted depending on desired sensitivity. The value of 8 could possibly be altered to read "Error Threshold". If this is true, as indicated at 200, a width error has occurred. The status flag is set at 202 and the unit stops. The system exits at 204. The number 8 provides an arbitrary window of acceptability.

If there is no error, the width average buffer is set up at 206 and a check is made at 208 of whether or not it is the first note. If it is not, the current width measurement is added into the buffer 210 to produce an average at 212 and the system exits at 214. If it had been the first note, the average is indicated at 216 and the system exits at 218.

While we have described our invention in terms of counting the number of energized, completely unblocked LEDs and obtaining a percentage by which a partially blocked LED is unblocked, it will readily be appreciated that we could as well count the number of fully blocked LEDs and obtain a percentage by which a partially blocked LED is blocked.

It will be seen that we have accomplished the objects of our invention. We have provided a device for measuring the width of a document, such as a currency note. Our device is more accurate than are similar devices of the prior art. It is certain in operation. It is simple in construction and operation for the results achieved thereby.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for accurately determining the position with respect to a reference point of the edge of a document traveling along a path including a combination, a plurality of energizable light emitting devices disposed along a line extending transversely of said path from said reference point, said devices including devices at the ends of said line, common light detecting means associated with said line of devices, means mounting said devices and said detecting means on opposite sides of said path whereby a document moving along said path completely blocks light from some of said devices while leaving others completely unblocked and only partially blocking a particular device adjacent to said edge and inwardly of said devices at the ends of said line, means for sequentially energizing said plurality of devices one by one in a certain direction from said reference point, and light detecting means producing a voltage at a particular level in response to light from one of said devices in the completely unblocked condition thereof, means for detecting a deviation of said voltage from said level in response to light from said only partially blocked particular device adjacent to said edge and inwardly of said devices at the ends of said line, said detecting means producing an output upon the occurrence of said deviation, first means responsive to the output of said deviation detecting means for inhibiting further operation of said energizing means upon the occurrence of said deviation, second means responsive to said deviation detecting means for determining the percent by which said particular device is only partially blocked, by means for counting the number of completely unblocked energized devices and means for combining said number and said percent unblocked determination.

2. Apparatus as in claim 1 in which said devices have a predetermined spacing, said apparatus including means for multiplying the content of said combining means by said spacing.

3. Apparatus as in claim 1 in which said means responsive to said detecting means comprises an analog-to-digital converter, a comparator for producing an output when said detecting means output drops below a predetermined value and means responsive to said comparator for coupling said detecting means output to said analog-to-digital converter.

4. Apparatus as in claim 1 in which said means responsive to said light detecting means comprises an amplifier and means for adjusting the gain of said amplifier as said elements are sequentially energized so that the output of the amplifier remains constant in the absence of a document between the element and the detecting means.

5. Apparatus as in claim 4 in which said gain adjusting means comprises means for storing a number of gain values corresponding respectively to said elements, each of said, gain values being such that the output of said amplifier has the same predetermined value upon the energization of any of said elements.

6. Apparatus as in claim 1 in which said means responsive to said light detecting means comprises an amplifier, said apparatus including calibration means comprising means for initially individually energizing each of said elements with the remaining elements deenergized, means for setting the gain of said amplifier at a certain value each time an element is initially energized, means for comparing the output of said amplifier with a certain value, means responsive to said comparing means for changing the gain of said amplifier to respective gain values for each of said elements at which gain values the amplifier output is equal to said certain value, and means for storing a number of gain values equal to the number of elements.

7. Apparatus as in claim 6 including means for adjusting the gain of said amplifier in accordance with said stored values as said elements are sequentially energized so that the output of said amplifier remains constant in the absence of a document between the element and the detecting means.

8. Apparatus for accurately determining the width of a document between edges in a direction transverse to the path of movement of the document including in combination first and second pluralities of energizable light emitting devices disposed along a line extending transversely of said path from respective first and second reference points spaced by a predetermined distance, said pluralities of devices including devices at the ends of said line, respective strip photodiodes common to said pluralities of devices, means mounting said strip photodiodes on the opposite sides of said path from their associated plurality of devices whereby a document moving along said path for each plurality completely blocks light from some of said devices to the associated photodiode while leaving others completely unblocked and only partially blocking a particular device of the plurality adjacent to the associated edge, and inwardly of the device at the corresponding end of said line, respective means for sequentially energizing the devices of said pluralities one-by-one in certain directions from the associated reference points, respective means responsive to said photodiodes for producing a voltage at a particular level in response to light from a completely unblocked device of said pluralities, respective means associated with said voltage producing means for detecting a deviation of said voltage from said level in response to light from one of said only partially blocked particular devices adjacent to said edges and inwardly of the device at the corresponding end of said line, respective first means responsive to the output of one of said deviation detecting means for inhibiting further operation of the energizing means associated with the corresponding plurality of devices, upon the occurrence of a deviation, respective second means responsive to said deviation detecting means for determining the percent by which the corresponding particular device is only partially blocked, means for counting the number of completely unblocked energized devices of said pluralities and means for combining the count of said counting means with the percent unblocked determinations of the pluralities.

9. Apparatus as in claim 8 in which said devices have a predetermined spacing, said apparatus including means for multiplying the content of said combining means by said spacing to produce a distance measurement and means for subtracting said distance measurement from said predetermined distance to produce said width measurement.

10. Apparatus as in claim 8 in which said means responsive to said strip photodiode outputs comprises an analog-to-digital converter, respective comparators each of which produces an output when an associated strip photodiode output drops below a predetermined value, and respective means responsive to said comparator outputs for coupling said strip photodiode outputs to said analog-to-digital converter.

11. Apparatus as in claim 8 in which said means responsive to a strip photodiode output comprises an amplifier and means for adjusting the gain of said amplifier as said devices are sequentially energized so that the output of the amplifier remains constant in the absence of a document between the device and the photodiode.

12. Apparatus as in claim 11 in which said gain adjusting means comprises means for storing a number of gain values corresponding respectively to said devices, each of said gain values being such that the output of said amplifier has the same predetermined value upon the energization of any of said devices.

13. Apparatus as in claim 8 in which said means responsive to a photodiode output comprises an amplifier, said apparatus including calibration means comprising means for initially individually energizing each of said devices with the remaining devices deenergized, means for setting the gain of said amplifier at a certain value each time a device is initially energized, means for comparing the output of said amplifier with a certain value, means responsive to said comparing means for changing the gain of said amplifier to respective gain values for each of said devices, at which gain values the amplifier output is equal to said certain value, and means for storing a number of gain values equal to the number of devices.

14. Apparatus for accurately determining the position with respect to a reference point of the edge of a document travelling along a path including in combination
a plurality of discrete energy radiating elements disposed along a line extending transversely of said path from said reference point,
energy detecting means common to said elements,
means mounting said elements and said detecting means in cooperative relationship adjacent to said path whereby a document moving along said path completely covers certain of said elements while leaving others completely uncovered and only partially covering a particular element adjacent to said edge, means for sequentially activating said elements one-by-one,
said energy detecting means producing a voltage at a particular level in response to radiation from an element in one of said completely covered or completely uncovered conditions,
said energy detecting means producing a voltage which deviates from said particular level in response to radiation from said only partially covered particular element adjacent to said edge,
means for sensing a deviation of said voltage from said level in response to radiation from said only partially covered particular element adjacent to said edge,
means responsive to said element activating means and to said voltage at said particular level for counting the number of completely covered or completely uncovered elements,
an analog-to-digital converter,
means responsive solely to said deviation sensing means for coupling only the detecting means voltage resulting from said partially covered element to said analog-to-digital converter to determine the percent by which said particular element is partially covered or partially uncovered and
means responsive to said counting means and to said percent determining means for providing an accurate determination of the position of said edge with respect to said reference point.

15. Apparatus as in claim 14 in which said counting means counts completely uncovered elements.

16. Apparatus as in claim 14 in which said mounting means positions said elements and said detecting means on opposite sides of said path whereby a document covering an element blocks are passage of light from said element to said detecting means.

17. Apparatus for producing an accurate indication of the dimension between edges of a document travelling along a path in a direction including in combination,
a plurality of discrete energizable radiation emitting elements disposed along a line transverse to said path, said line having a length exceeding the greatest document dimension to be encountered,
radiation detecting means common to the devices of said plurality along said line,
means mounting said elements and said detecting means in cooperative relationship adjacent to said path whereby a document moving along said path completely covers certain of said elements while leaving certain other completely uncovered and only partially covering particular elements adjacent to said edges, means for sequentially energizing said elements one-by-one, said energy detecting means producing a voltage at a particular level in response to radiation from an element in one of said completely covered or completely uncovered conditions, said energy detecting means producing a voltage which deviates from said particular level in response to radiation from said only partially covered particular element adjacent to said edge, means for sensing a deviation of said voltage from said level in response to radiation from said only partially covered particular elements adjacent to said edges, means responsive to said element activating means and to said voltage at said particular level for counting the number of completely covered or completely uncovered elements, an analog-to-digital converter, means responsive solely to said deviation sensing means for coupling only the detecting means voltage resulting from said partially covered elements to said analog-to-digital converter to determine the percents by which said particular elements are partially covered or partially uncovered and means responsive to said counting means and to said percent determining means for providing an accurate indication of the dimension of said document between said edges.

18. Apparatus as in claim 17 including means for determining the average dimension measurement of a plurality of documents, means for storing said average dimension measurement, means for comparing the dimension measurement of a subsequent document with the stored average dimension measurement and means responsive to said comparing means for generating an error signal if the subsequent document measurement differs from the average measurement by a predetermined amount.

19. Apparatus as in claim 18 for updating said average dimension measurement with said subsequent document measurement if said subsequent document measurement does not differ from the average measurement by said predetermined amount.

20. Apparatus as in claim 17 in which said certain elements are those elements between the ends of said line and said partially covered elements.

* * * * *

UNITED STATES PATENT AND TRADEMARK OFFICE
CERTIFICATE OF CORRECTION

PATENT NO. : 5,309,515

DATED : May 3, 1994

INVENTOR(S) : Peter Truong, Michael L. DeFeo, Paul Hessler, Kenneth W. Maier, Martin J. Poloncarz, William Sherman III It is certified that error appears in the above-identified patent and that said Letters Patent is hereby corrected as shown below:

Column 7, line 68 - delete "and", insert -- said --.

Column 8, line 14 - delete "by".

line 39 - delete " , ".

Column 10, line 55 - delete "are", insert -- the --.

Column 11, line 2 - "other" should read -- others --.

Signed and Sealed this

Sixteenth Day of August, 1994

*Attest:*

BRUCE LEHMAN

*Attesting Officer*     *Commissioner of Patents and Trademarks*